(No Model.)

H. BUNKER.
SLED BRAKE.

No. 493,680. Patented Mar. 21, 1893.

Witnesses
W. G. McMillan
F. A. Woodward

Inventor
Harman Bunker
by Donald C. Ridout & Co
Attys

THE NORRIS PETERS CO., PHOTO-LITHO., WASHINGTON, D. C.

UNITED STATES PATENT OFFICE.

HARMAN BUNKER, OF BARRIE, CANADA, ASSIGNOR OF ONE-HALF TO JAMES HERBERT McKEGGIE, OF SAME PLACE.

SLED-BRAKE.

SPECIFICATION forming part of Letters Patent No. 493,680, dated March 21, 1893.

Application filed May 4, 1892. Serial No. 431,790. (No model.)

*To all whom it may concern:*

Be it known that I, HARMAN BUNKER, of the town of Barrie, in the county of Simcoe, in the Province of Ontario, Canada, have invented a certain new and Improved Drag for Sleighs, of which the following is a specification.

The object of the invention is to provide a simple device by which a sleigh may be prevented from running on the heels of a horse in going down hill, or to be held so as to relieve the horse of its weight when standing still on a hill and it consists, essentially, of a plate pivoted on the runner of the sleigh and arranged so that it may be set so that a pointed end formed on it will strike into the ground and hold the sleigh from running down the hill; substantially as hereinafter more particularly explained and then definitely claimed.

Figure 1:
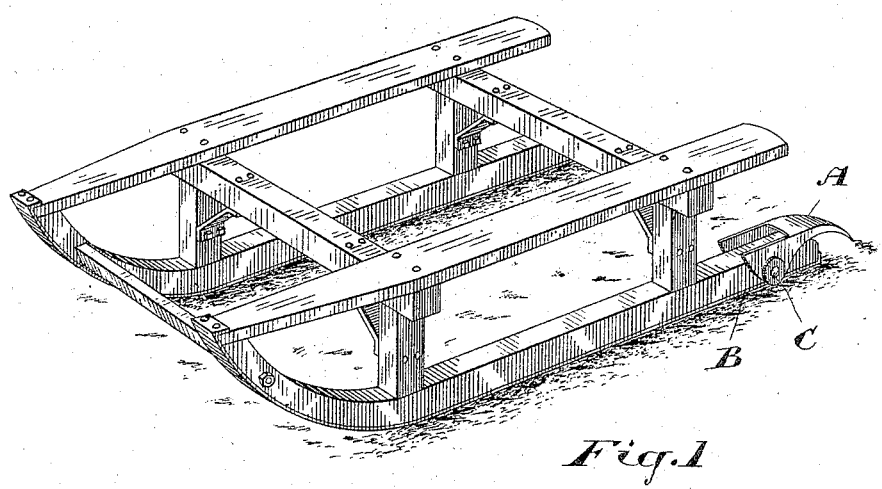
Figure 2:
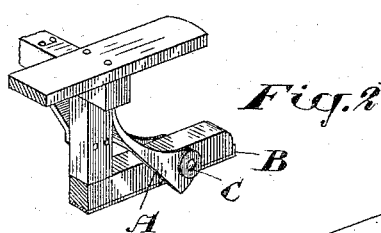
Figure 3:
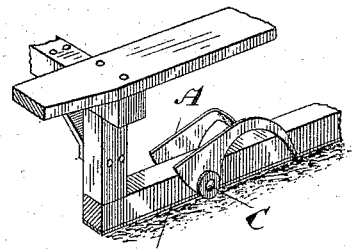
Figure 5:
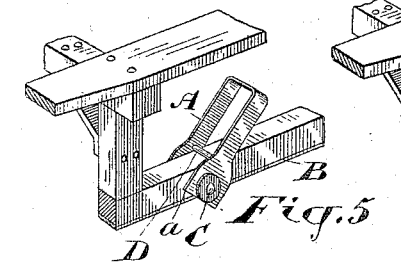
Figure 4:
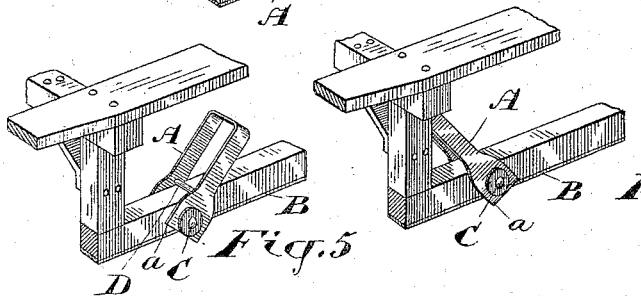

Figure 1, is a view of a sleigh provided with one of my improved drags, the said drag being set to hold the sleigh from running down the hill while it is being hauled up. Fig. 2, shows the same drag set to prevent the sleigh running onto the heels of the horse while going down hill. Figs. 3 and 4, represent an alternative form of drag set in the center of the sleigh. Fig. 5, is an alternative form of drag, something similar to that shown in Fig. 1, but set in the center of the sleigh.

Like letters of reference indicate corresponding parts in each figure.

In Fig. 1, I show a curved plate A, held on the end of the runner B, by a pivot pin C. In Fig. 1, the curved plate A, is set down so that its pointed end shall rest on the ground. So long as the sleigh is pulled forward up the hill, the pointed end of the plate A, does not interfere with the progress of the sleigh, but the moment that the horse stops to rest, the pointed end of the plate A, enters the ground so as to relieve the horse of its weight. There is only one plate shown in Fig. 1, but of course there should be one on each runner. The plates may be pivoted on the runner at any desired point, but in Fig. 1, I show it on the end of the runner. It would of course work as shown in Figs. 3, 4 and 5 if placed in the center of the runner, the point of the plate being formed so as to avoid the runner as indicated in Figs. 3, 4 and 5.

In going down hill, it is sometimes necessary to give the horse a rest. In such a case the plate A, is set as shown in Fig. 2, so that it will force another point of the said plate into the ground and thus hold the sleigh from running onto the heels of the horse.

In the alternative form shown in Figs. 4 and 5, the pointed heel a, of the plate A, is used instead of a pointed end, the shape of the plate A, being entirely different from the shape shown in Figs. 1 and 2.

The pivot pin C, is the same in all cases, but in order to lock the plate A, when made as shown in Fig. 5, a pin D, between the two sides of the plate A, is placed just above the runner B, so that when the plate A, is set at the proper angle to allow the heel a, to enter the ground, the said pin D, butts against the top of the rail and holds the plate from moving farther.

What I claim as my invention is—

1. A brake for sleds, comprising a plate pivoted on the runner, having a point at each end, and constructed so that either may be in contact with the ground, substantially as described.

2. A plate A, pivoted on the runner B, heels a, formed on the plate, and a pin D, fixed to the plate and extending across the runner B, substantially as and for the purpose specified.

Barrie, April 21, 1892.

HARMAN BUNKER.

In presence of—
T. BUCROFT,
I. S. JAMIESON.